United States Patent [19]
Geschwender

[11] Patent Number: 5,630,774
[45] Date of Patent: May 20, 1997

[54] EXERCISE TECHNIQUE AND APPARATUS

[76] Inventor: Robert C. Geschwender, 3855 Orchard St., Lincoln, Nebr. 68503

[21] Appl. No.: 507,033

[22] Filed: Jul. 31, 1995

Related U.S. Application Data

[63] Continuation of Ser. No. 333,861, Nov. 3, 1994, abandoned, which is a continuation of Ser. No. 919,825, Jul. 27, 1992, abandoned.

[51] Int. Cl.$^6$ .............................. A63B 25/08; B62M 1/00
[52] U.S. Cl. ................. 482/57; 482/51; 280/267
[58] Field of Search .................... 482/51, 57; 280/62, 280/63, 267, 253, 268–269

[56] References Cited

U.S. PATENT DOCUMENTS

| | | | |
|---|---|---|---|
| 1,323,004 | 11/1919 | Boyd | 74/594.4 |
| 2,641,249 | 6/1953 | Brockman | 482/57 |
| 4,779,863 | 10/1988 | Yang | 482/51 |
| 4,786,050 | 11/1988 | Geschwender | 482/57 |
| 5,046,723 | 9/1991 | Szymski et al. | 482/57 |
| 5,167,597 | 12/1992 | David | 280/267 |

*Primary Examiner*—Stephen R. Crow

[57] ABSTRACT

A three-wheeled exercise vehicle includes an "L" shaped frame, a pivot about which the frame pivots as the vehicle is used by an exerciser, pedals for moving the vehicle from place to place and steering wheels that turn as the frame pivots. The user steers the exercise vehicle by leaning in a direction at an angle to the direction of movement of the exercise vehicle, wherein at least one steering wheel turns an amount related to said leaning about an axis substantially perpendicular to the horizontal. To drive straight, the user pedals the vehicle and shifts weight from the upper body to compensate for his automatic shifting of weight as he or she pedels, whereby an operator using the exercise vehicle while exercising must exercise more than one portion of the exerciser's body to both move said pedals and to control said pivoting.

21 Claims, 3 Drawing Sheets

EXERCISE TECHNIQUE AND APPARATUS

This application is a continuation of application Ser. No 08/333,861, filed Nov. 3, 1994, which is a continuation of application Ser. No. 07/919,825, filed Jul. 27, 1992 abandoned.

This invention relates to exercise techniques and equipment.

One type of exercise equipment includes wheeled vehicles that are intended to be driven outdoors for exercise. Another type of exercise equipment is stationary rather than being a vehicle and some of these require both arm movement and leg movement such as those which imitate cross-country skiing activities where a person must move his or her feet on a treadmill type device as though skiing and his or her arms as though using ski poles.

The vehicle type exercisers have a disadvantage in that they need relatively smooth locations such as pavement and they primarily exercise the legs rather than the upper body and arms. The stationary exercising devices have the disadvantage of generally being located in one place, commonly indoors, and not permitting movement such as that joggers use.

SUMMARY OF THE INVENTION

Accordingly, it is an object of the invention to provide a novel exercise apparatus.

It is a further object of the invention to provide a novel exercise technique.

It is a still further object of the invention to provide a novel vehicle which exercises both the upper body and the legs when used.

It is a still further object of the invention to provide a novel exercise vehicle and technique for exercising that permits use outside as a vehicle but causes arm and shoulder exercise as well as leg exercise in use.

It is a still further object of the invention to provide a novel exercise apparatus which can be easily transported from location to location.

It is a still further object of the invention to provide an exercise device in which tilting of the exercise device in using it causes it to turn.

It is a still further object of the invention to provide an exercise technique in which an operator moves a vehicle propelled by leg power and controls the steering of the assembly through a mechanism which tends to turn as the operator propels himself by leg movement unless the shift of weight of the operator during peddling of the vehicle is compensated for by body movement so that both the legs and upper body of the operator are exercised.

In accordance with the above and further objects of the invention, a pedal-driven exercise vehicle includes a frame that is pivotable about a horizontal axis and has wheels that turn as the frame pivots. The vehicle is designed so that the operator stands as he or she pedals. To prevent turning of the wheels as the operator shifts his or her weight during peddling, the operator must shift his or her upper body position to prevent pivoting of the frame. Similarly, to turn, the operator leans to pivot the frame and thus turn the wheels.

In the preferred embodiment, the vehicle includes a front wheel assembly that is pivotably connected to a supporting main frame shaped as the letter "L" when viewed from the left side. The vehicle includes pedals and a chain drive to a rear wheel. The pedals permit the operator to propel the vehicle in the manner of a bicycle or tricycle but the shifting of the operator's weight tends to cause the main frame to pivot from side to side and this pivoting tends to turn the wheels so that the operator must correct for pivoting to go straight but must lean to turn the vehicle.

To control turning and forward motion, the front wheel assembly contains two wheels that turn together in response to the pivoting of the main frame and the rear assembly includes one wheel with the apparatus being propelled by pedals through a chain drive connected to the rear wheel. The vehicle has no support apparatus positioned for the operator to conveniently sit and the pedals are adapted for riding while the operator is standing. For this purpose, each of the pedals is sufficiently large to support a foot. The pedals remain substantially flat with a slight angle during the power portion of the action by the operator that occurs when the operator is exerting force on the pedal to propel the bicycle forward.

To permit easy shipment or transportation of the vehicle to the place of use, handlebars are foldable downwardly toward the rear wheel to reduce the height of the vehicle and the front wheels may be removed for easy packing so the vehicle may be moved by an automobile or the like easily to a location for use.

From the above description, it can be understood that the exercise apparatus and technique of this invention has several advantages, such as for example: (1) it provides full body exercise while the operator is moving the vehicle outdoors such as along a path; (2) it is compact and easily moved from location to location; and (3) it permits ease of movement during use so that the operator can travel along jogging paths or the like which are pleasant for exercising.

SUMMARY OF THE DRAWINGS

The above-noted and other features will be better understood from the following detailed description when considered with reference to the accompanying drawings, in which.

DETAILED DESCRIPTION

Figure 1:
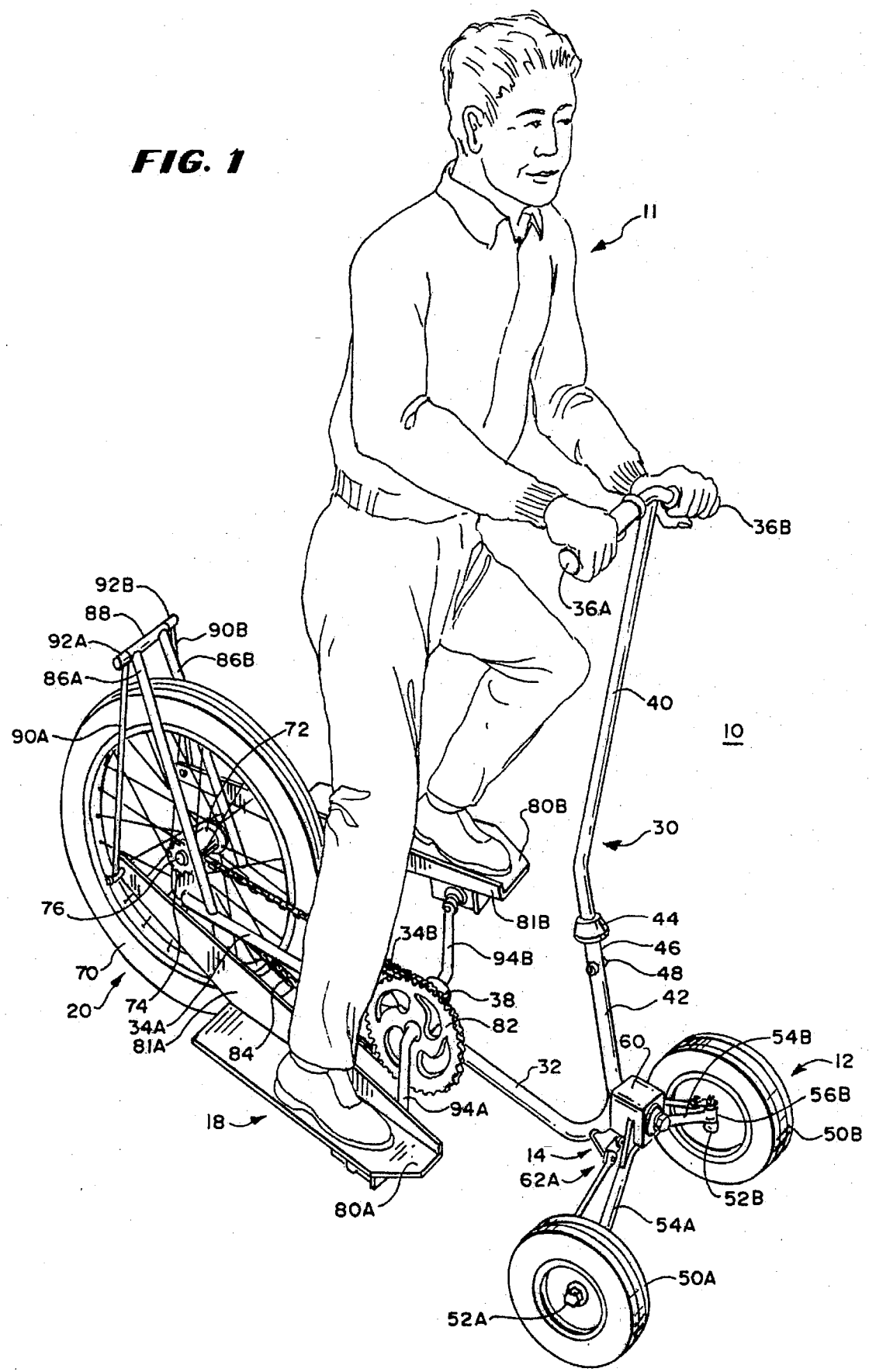
FIG. 1 is a perspective view of a preferred embodiment of exercise vehicle.

In FIG. 1, there is shown an exercise vehicle 10 having a front wheel assembly 12, a pivot connection 14, a drive assembly 18, a rear wheel assembly 20 and a main frame formed of tubular material. The main frame generally connects the front wheel assembly 12, pivot connection 14, drive assembly 18 and rear wheel assembly 20 and is generally shaped as an "L" when viewed from the left-hand side. The main frame is pivotably mounted to the front wheel assembly 12 by the pivot connection 14 and to the rear wheel assembly 20 so it can pivot about the pivot connection 14 from side to side with the upstanding member moving from side to side in the plane of the main frame. The drive assembly 18 connects the main frame and the rear wheel assembly 20 to a drive rear wheel assembly under the power of a person 11 who is exercising.

The main frame includes a generally vertical upright section 30, a generally horizontal section 32 bifurcated at its rear end into two generally horizontal bars 34A and 34B. The generally horizontal section 32 joins the generally vertical section 30 at the forward end of the generally horizontal section 32 and at the bottom of the generally vertical section 30. The rearward end of the generally horizontal section 32 forms the bifurcated section forming horizontal right and left bars 34A and 34B which support the rear wheel assembly 20. The generally vertical upright section 30 at its uppermost end joins right and left handlebars 36A and 36B and a drive housing 38 is mounted to the generally horizontal bar 32 just ahead of the bifurcated portion 34A and 34B.

The generally vertical upright section 30 includes an upper vertical portion 40, a lower vertical portion 42, a collar 44 and a gudgeon 46 or U-shaped sections of the main frame with a pin 48 passing through the bottom of the upright portions and through the lower end of the upper vertical portion 40. The upper vertical portion 40 has extending horizontally therefrom at its top end right and left handlebars 36A and 36B respectively and at its lower end a shape and size that enables it to fit within the upper end of the lower vertical portion 42.

To permit folding of the vehicle into a more compact shape for transportation, the gudgeon 46 includes a cutaway portion forming a U-shaped upper end for the lower vertical portion 42 with the cutaway portion being aligned with the plane of the main frame and a pin 48 orthogonal to the plane of the main frame. The cutaway portion receives the lower end of the upper vertical portion 40 and is wide enough so the upper vertical portion 40 may pivot downwardly within the gudgeon 46 in the plane of the horizontal and upright frame members. The pin 48 pins the lower portion of the upper vertical portion 40 of the generally vertical upright section 30 at the lower end of the cutaway portion to form the gudgeon 46 so the upright vertical position may pivot through the cutaway portion of the gudgeon 46 to a horizontal position. The collar 44 slides on the upper vertical portion 40 and may, in its lower-most position, engage the top of the lower vertical portion 42 above the gudgeon 46 to hold the upper vertical portion 40 in place vertically, and when moved upwardly, permits the upper vertical portion 40 to fold downwardly.

The vertical upright section 30 and the handlebars 36A and 36B only pivot about the pivot connection 14 in a direction substantially orthogonal to the plane of the L-shaped main frame and do not rotate about a vertical axis in the manner of bicycles. Instead, the pin 48 prevents rotation at the collar 44 and the main frame is integrally formed as a unit except for the gudgeon 46. Instead, the handlebars 36A and 36B are utilized for support by the cyclist 11 who is standing on the pedals of the drive assembly and, for this purpose, are mounted in the preferred embodiment approximately 36 inches from the level of the pedals when they are substantially in the same horizontal plane and should be within a range of 20 inches to 48 inches to accommodate a range of different heights of the cyclist from children to tall adults.

The handlebars 36A and 36B may be of any length suitable for holding by the user of the exercise vehicle for support but generally are in the range of five inches to 36 inches. The frame members are generally tubular steel but may be made out of any suitably strong member including some types of plastic tubing. The tubular members of the frame are selected to enable one of the upper and lower vertical portions 40 and 42 of the vertical upright section 30 to fit one into the other and to enable the collar 44 to fit over both.

In the preferred embodiment, the tubes forming the upper vertical portion 40 of the vertical upright section 30 of the frame is one inch in outer diameter to match the inner diameter of the lower vertical portion 42 which receives the end of the upper vertical portion 40. The lower vertical portion 42 has an outer diameter of substantially 1¼". The collar 44 has a substantially conical inner surface with an internal diameter which at about midpoint section that tightly grips the 1¼ inch outer diameter of the lower tubular portion 42.

The front wheel assembly 12 includes right and left wheels 50A and 50B, right and left axles 52A and 52B for the wheels and right and left axle struts 54A and 54B. In the preferred embodiment, the wheels 50A and 50B are approximately 12" in outer diameter but larger wheels may be used for rougher terrain and smaller wheels may be used for smoother terrain. The axles 52A and 52B pass through the wheel assemblies and in the preferred embodiment, are intended to hold the wheels 50A and 50B on the outer end by a removable pin so that the wheels 50A and 50B may be removed for more compact shipping if desired. Generally, the wheels 50A and 50B are spaced from each other approximately a foot at their inner ends and the struts 54A and 54B are at an angle of approximately 30 degrees from the horizontal.

The pivot connection 14 includes right and left axle universal joint supports 56A and 56B (56B being shown in FIG. 1), a pivot axle housing 60, and a front wheel assembly control section 62A. The right and left universal joint supports 56A and 56B mount the right and left struts 54A and 54B to the right and left axles 52A and 52B to permit rotation of the axle therein and rotation of the axle bearing on the universal joint. This permits each of the two wheels to turn in the same direction by substantially the same amount about different substantially vertical axes while each of the wheels is rotating about a different substantially horizontal axis. The vertical axis about which each wheel turns is spaced less than 6 inches from the wheel.

The front wheel assembly control section 62A causes the wheels 50A and 50B to turn as the main frame pivots about a substantially horizontal pivot axle in the pivot axle housing 60 as controlled by the weight of the cyclist 11 so that the pivoting occurs as the cyclist 11 shifts his or her weight from right to left with respect to the housing 60. Thus, upper body exercise occurs as the cyclist 11 turns since he or she must utilize the muscles of the upper body to turn by shifting his or her weight and occurs when the cyclist 11 shifts his or her weight during peddling since the upper body must be moved to recenter the center of gravity in the plane of the frame to avoid turning.

In the preferred embodiment, the pivot axle housing 60 includes a resilient centering device that tends to limit the amount of pivot so that the exercise vehicle 10 is normally upright. However, this bias may be provided at any linkage such as, for example, it may be incorporated in the front wheel assembly control section 62 rather than the pivot axle housing 60.

The rear wheel assembly 20 includes the rear wheel 70, the axle 72 within the hub of the rear wheel 70, the bifurcated horizontal apertured portions 34A and 34B of the main frame and the driven sprocket wheel 74. This assembly 20 is conventional and the wheel 70 is mounted to be driven in the way of an ordinary bicycle by a chain 84 engaging the sprocket wheel 74 and driven by pedals 80A and 80B, with the axle of the wheel 70 being within the hub and having each of its two ends mounted to a different one of the bifurcated portions 34A and 34B of the main frame. The rear wheel assembly 20 is generally conventional for bicycles.

The drive assembly 18 includes right and left pedals 80A and 80B, a drive sprocket wheel 82, a chain 84 and a pedal mount assembly. Because the exercise vehicle 10 is intended to be driven with the operator 11 standing upright, the pedals 80A and 80B are relatively large to accommodate the foot of a user and the pedal support assembly supports a rear portion of the pedals so that it remains relatively horizontal to permit adequate support. For this purpose, the pedals are pivoted about handles on the drive sprocket wheel at a forward location and pivoted about a portion of the rear pedal support assembly near the end of the pedals. In the preferred embodiment, the pedals 80A and 80B are approximately one foot long in the support section and four inches wide but should be at least four inches long and two inches wide. A vertical support member extends from the pedals back to the rear pedal support assembly.

To support the rear portion of the pedals 80A and 80B, the rear pedal support assembly 87 includes right and left rear drive struts 86A and 86B, a rear horizontal pivot bar housing 88, right and left rear pivot arms 90A and 90B, right and left rear pivot shafts 92A and 92B, and right and left pedals arms 94A and 94B. The right and left rear drive struts 86A and 86B are on opposite sides of the rear wheel assembly 20 and extend between rear portions of the corresponding ones of the rear right and left horizontal bars 34A and 34B upwardly to the rear horizontal pivot bar housing 88 to support the pivot bar housing 88 in position above the rear wheel 70, rearwardly of the main frame a sufficient distance so as to not interfere with the operator 11 and sufficiently forward of the rear end of the rear wheel 70 so as to not increase the length of the vehicle 10. It is generally a slight amount wider than the rear wheel 70, such as four inches or so to allow connection on opposite sides of the rear wheel 70 and a slight further extension but close enough to the rear wheel 70 to not increase the size of the vehicle 10 when stored. Generally, it is an inch or two above the rear wheel 70.

On the ends of the pivot bar housing 88, the right and left rear pivot arms 90A and 90B are pivotally mounted to extend along opposite sides of the rear wheel 70 downwardly to the ends of the support members for the pedals 80A and 80B to which they are rotatably mounted so that as the pedals 80A and 80B move, the rear pivot arms 90A and 90B swing back and forth in a pendulum style. They are positioned to control the angle of the pedal so that it is at an angle that provides support for a user standing on it and permits strong driving force during a power stroke by the user. In the preferred embodiment, the right and left rear pivot arms 90A and 90B are ten and one half inches long and their lowest point at the lowest pivot connection to the pedal is approximately level with the rear wheel axis. This lower point should be no lower than six inches below the axis and the length of the rear pivot arm 90A or 90B should not be more than two feet to permit ready storage of the vehicle 10 for transportation.

As shown in FIG. 1, a person 11 using the exercise vehicle 10 stands, holding the handlebars 36A and 36B with his or her feet resting substantially flat on the pedals 80A and 80B. The operator 11 shifts his or her weight onto one pedal at a time to drive the exercise vehicle 10 forwardly by operating the drive assembly 18 to drive the rear wheel assembly 20. Each of the pedals 80A and 80B is rotatably mounted to a different one of the two drive crank ends and pivotally mounted at a rear end to a pivot point that maintains the attitude of the pedal flat or at a slight angle, with the angle when the pedal is in its position in front of the drive assembly 18 and closest to the front wheels 50A and 50B being such as to provide easier pressure by the user by providing better contact with the foot for pressure.

Generally, the pedals 80A and 80B are substantially horizontal but may have an angle of less than fifteen degrees from the horizontal when in the drive or power portion of their cycle as maximum force is exerted against them by the user. This portion of the cycle is from between 45 degrees above the horizontal to 45 degrees below the horizontal and forward of the center of the drive sprocket wheel 82 (viewed from the right side of the vehicle, one thirty o'clock to four thirty o'clock). The plane of the pedal from its rear end to front end: (1) is with the forward end upward with respect to the ground plane (positive angle in first quadrant) when the pedal is above the three o'clock position; and (2) is with the forward end downward (negative angle in the fourth quadrant) when the pedal is below the three o'clock position of the drive portion of the cycle of the pedal.

As the user 11 shifts his or her weight to the drive foot, the center of gravity of the user shifts tending to tilt the main frame and thus turn the bicycle. However, the user automatically moves the upper part of his or her body in the opposite direction to center the center of gravity over the main frame, thus avoiding the turning of the wheels when that person is trying to drive in a straight path. When turning, the user leans in the direction of the turn. The radius of turning depends on the ratios of portions of the pivot connection and front wheel assembly. These ratios are designed and made to provide usable turn radii with an amount of leaning that is not so small as to be uncontrollable or to easily happen by accident nor so large as to be difficult to easily cause.

Figure 2:
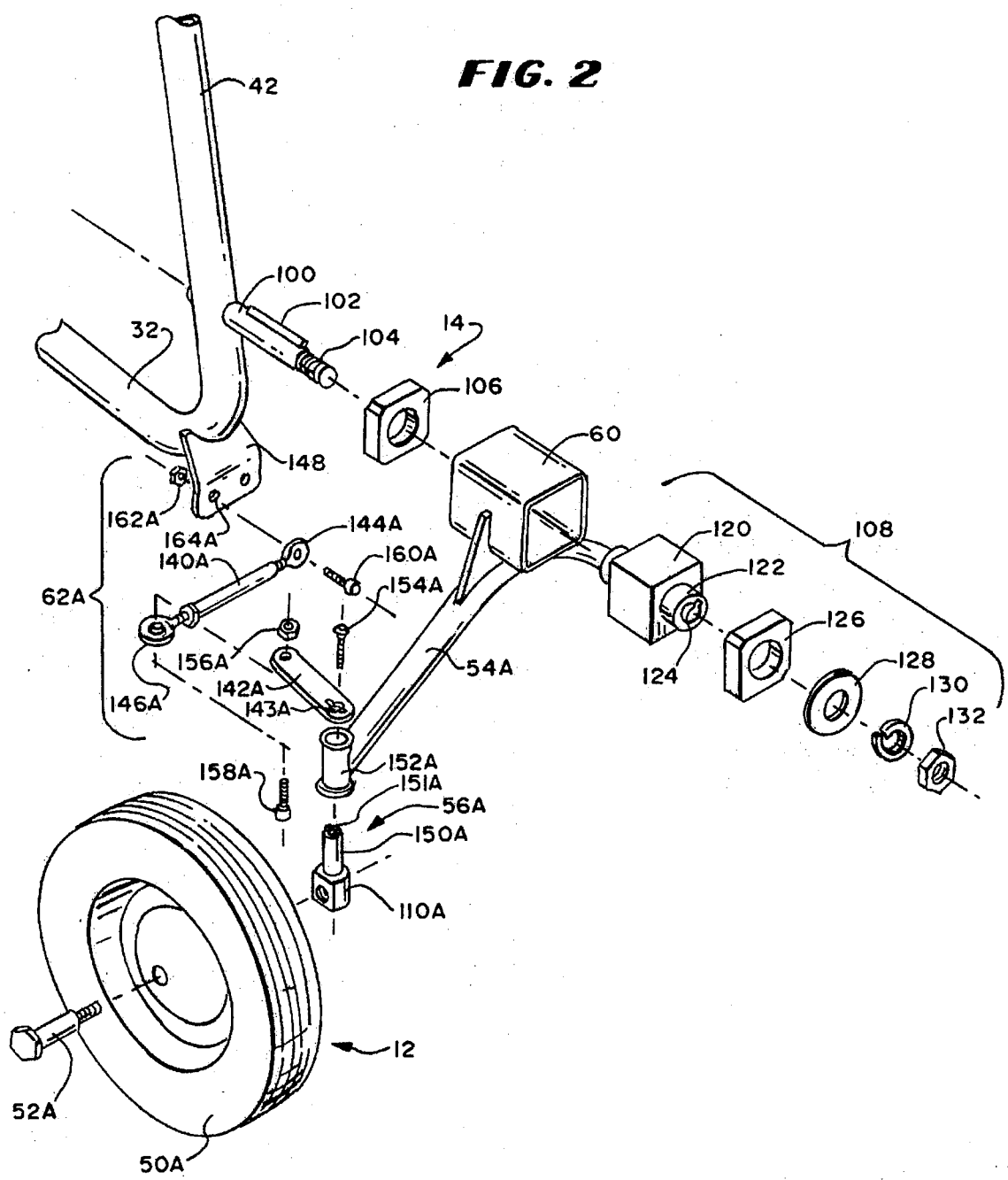
FIG. 2 is a fragmentary perspective exploded view of a front wheel portion of the apparatus of FIG. 1.

In FIG. 2, there is shown a fractional exploded perspective view of one side of the front wheel assembly 12, a portion of the lower horizontal frame member 32, a portion of the lower vertical frame member 42 and the pivot connection 14 showing the manner in which turning is accomplished by the pivot connection 14. For this purpose, the pivot connection 14 includes a pin 100, a housing 60, a stabilizing assembly 108 and a right side front wheel assembly control section 62A.

To pivotally support the pivot housing 60 to the main frame, the pivot pin 100 is welded to the lower vertical frame member 42 of the vertical upright section 30 (FIG. 1) to extend rigidly horizontal to the earth and perpendicular to the lower vertical portion 42 of the vertical upright section 30 (FIG. 1) of the main frame. It is threaded at its distal end 104 and includes a parallel key 102 extending along its upper surface in the direction of its longitudinal axis a substantial distance between the lower vertical portion 42 of the vertical upright section 30 (FIG. 1) and the externally threaded end 104.

The stabilizing assembly 108 includes a cylindrical tube 122, an elastomeric block 120, a washer 128, a lock washer 130 and a nut 132. The elastomeric block 120 has top, bottom, right and left sides shaped and sized to fit conformably within the housing 60. Two spacer blocks 126 and 106 fit within the housing 60 on either side of the elastomeric block 120 so that the three units completely fill the inner portion of the housing 60.

To provide torsional force keeping the main frame upright, the tube 122 is firmly adhered to a cylindrical opening passing through the longitudinal axis of the block 120. A keyway 124 in the metal tube 122 is sized to receive the key 102 on the pivot pin 100 so that, when assembled, the pivot pin 100 extends through the tube 122.

The tube 122 extends beyond the block 120 for ease in assembly. The two spacer blocks 106 and 126 each have a corresponding opening through its center adapted to conform to the outside periphery of the tube 122 so that the three blocks fill the housing 60, with the tube 122 conforming and extending through their centers aligned with the longitudinal axes of the pivot pin 100. The tube 122, the elastomeric block 120 and the spacer blocks 106 and 126 fit within the metal housing 60, with the washer 128, lock washer 130 and nut 132 being threaded in place to hold the housing 60 against the lower portion of the vertical upright section 30 (FIG. 1) of the exercise vehicle 10 (FIG. 1).

With this arrangement, the lower vertical frame member 42 may pivot about the pivot connection 14 with respect to the front wheel assembly 12 within the range the elastomeric block 120 is able to deform to permit rotation of the pivot pin 100. When released, the main frame springs upright again so it is stable in the upright position. Thus, a person can stand on the pedals while the vehicle remains upright in a stable position and the vehicle remains upright normally when unattended.

In the preferred embodiment, the elastomeric block 120 permits pivoting of no more than thirty degrees on either side of the vertical in the preferred embodiment and such pivoting should be less than forty-five degrees in any embodiment. The pin 100 is firmly mounted for movement with the lower vertical frame member 42 so that it does not rotate with respect to the main frame. This may be accomplished by spot welding or by a sufficiently tight fit or through the utilization of a key in the pivot and keyway cut into the tube 122.

To cause the wheels 50A and 50B to turn in the same direction with respect to a vertical plane in relation to pivoting of the main frame about the pivot connection 14 as the operator leans in one direction or the other, the front wheel assembly control sections 62A and 62B includes levers 142A and 142B, turnbuckles 140A and 140B, universal joint assemblies 56A and 56B and a bracket 148 (parts indicated by reference numerals labeled with the suffix B not shown in FIG. 2 because only one of the front wheel assembly control sections 62A and 62B is described herein in detail with respect to FIG. 2, the opposite sections 62A and 62B operating in the same manner to turn the wheels in the same direction on the opposite side of the main frame (FIG. 1) when the operator 11 pivots the main frame in one direction or another about the pivot connection 14). The front wheel assembly control sections 62A and 62B are adjusted so that the wheel on the inside of a turn turns sharper for a smooth turn without dragging either wheel so that the amount the user leans in either direction away from the plane of the main frame corresponds in reasonable proportion to the radius of turn.

In the front wheel assembly control section 62A, the lever 142A acts as a steering arm and is pivotally mounted at one end to the universal joint assembly 56A and at the other end rotatably mounted to one end of the turnbuckle 140A, which acts as a tie rod. The other end of the turnbuckle 140A is rotatably mounted to the bracket 148 so that, as the lower vertical portion 42 of the vertical part of the main frame 30 pivots in one direction about the pivot connection 14, the turnbuckle 140A is moved in the opposite direction, carrying one end of the lever 142A with it and thus turning the shaft 52A of the wheel 50A by rotating the joint 110A. To accomplish this, the joint 110A rotates with the end of the lever 142A to which it is connected. The angle of the levers 142A and 142B are adjusted by adjusting their respective turnbuckles 140A and 140B to permit the wheel on the inside of a turn to turn more sharply than on the outside of a turn. The angle with respect to the plane of the wheel is about ten degrees toward the main frame.

To hold the bracket 148, the turnbuckle 140A, the lever 142A and the universal joint 56A together, the universal joint holding cylinder 152A is tubular and mounted vertically for movement with the wheel strut 54A and receives a universal joint shaft 150A which extends through it, having the joint 110A which receives the shaft 52A mounted for rotation with it at its opposite end. It is held to an eyelet within the lever 142A by the bolt 154A that mounts rigidly to the top of the universal joint shaft 150A. The opposite end of the lever 142A is mounted to an eyelet 146A of the turnbuckle 140A by the nut and bolt 156A and 158A respectively. The mounting permits rotation of that end of the lever 142A within the eyelet 146A. The opposite end of the turnbuckle 140A is mounted to an aperture 164A in the bracket 148 and rotatably fastened therethrough by a nut and bolt 162A and 160A. The front wheel assembly control section 62B (not shown in FIG. 2) is mounted in the same manner. The bracket 148 is welded to the lower portion 42 of the upright member 30.

To provide a controllable amount of turn of the wheels 50A and 50B by an operator leaning in one direction or the other, the lever 142A has a length that is related to the distance between the pivot pin 100 and the opening 164A for the inner end of the turnbuckle 140A so that the turn is not too great with minor shifts in the operator's position to be difficult to control and yet the turn is large enough with a reasonable amount of leaning so that the operator will easily be able to turn without leaning an excessive distance in one direction. Generally the amount of turn of the wheels is between one and one half and two and one half degrees for every one degree the main frame is leaned from the vertical.

To provide a reasonable amount of turn upon leaning, the ratio of the distance between the pivot point and one end of the turnbuckle 140A to the ratio of the distance from one end of the lever 142A to the universal joint assembly 56A is in the range of ratios of one to one and one to three. Similarly, because the operator will be holding the handlebars 36A and 36B (FIG. 1) as he or she leans, the distance of the handlebars 36A and 36B (FIG. 1) to the ground as compared to the distance of the pivot point to the ground also is related to the amount of leaning comfortably so that the ratio of the handlebars 36A and 36B (FIG. 1) above the ground to the pivot point above the ground should be in the range of ratios of fifteen to one and six to one. To accommodate both children and relatively tall people, the handlebars 36A and 36B (FIG. 1) should be positioned above the pedals 80A and 80B (FIG. 1) when the pedals are at the same elevation above ground at a distance of between two feet and five feet.

Figure 3:
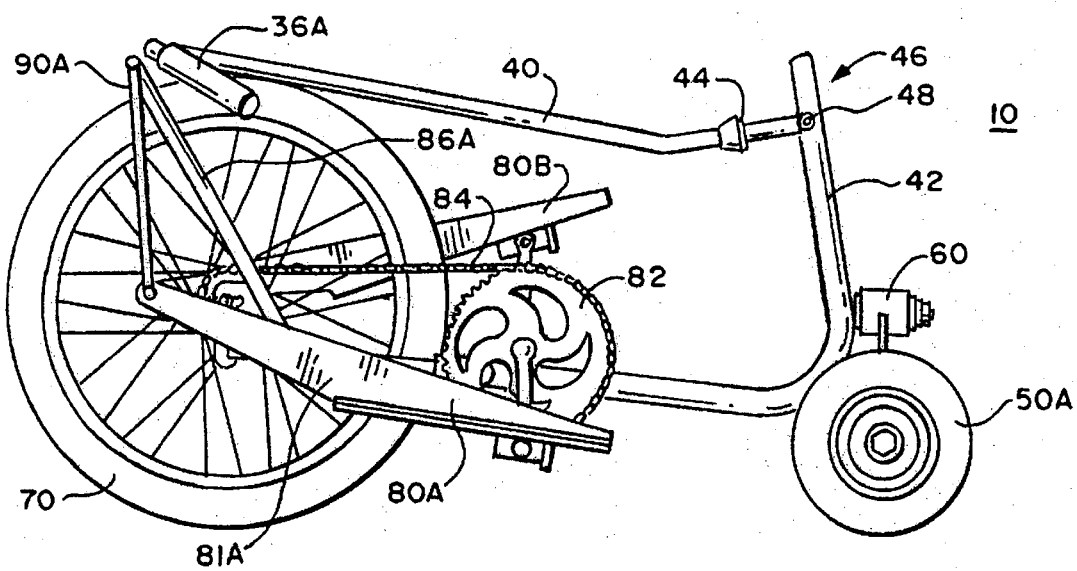
FIG. 3 is a side view of the apparatus of FIG. 1 in a storage position.

In FIG. 3, there is shown a right elevational view of the exercise vehicle 10 showing the collar 44 moved upwardly a sufficient distance to clear the lower vertical portion 42 of the generally vertical upright section 30 (FIG. 1) of the main frame and the upper vertical portion 40 has been pivoted in the gudgeon 46 to its storage position in which the handlebars 36A and 36B (only 36A being shown in FIG. 3) are positioned downwardly against the tire 70 with the upward vertical portion 40 of the generally vertical upright section 30 (FIG. 1) being substantially horizontal so as to permit easy storage. As shown in this view, the cutaway portion of the lower vertical portion 42 forming the gudgeon 46 is open on only one side in the preferred embodiment although it could have been cut away on both sides.

Figure 4:
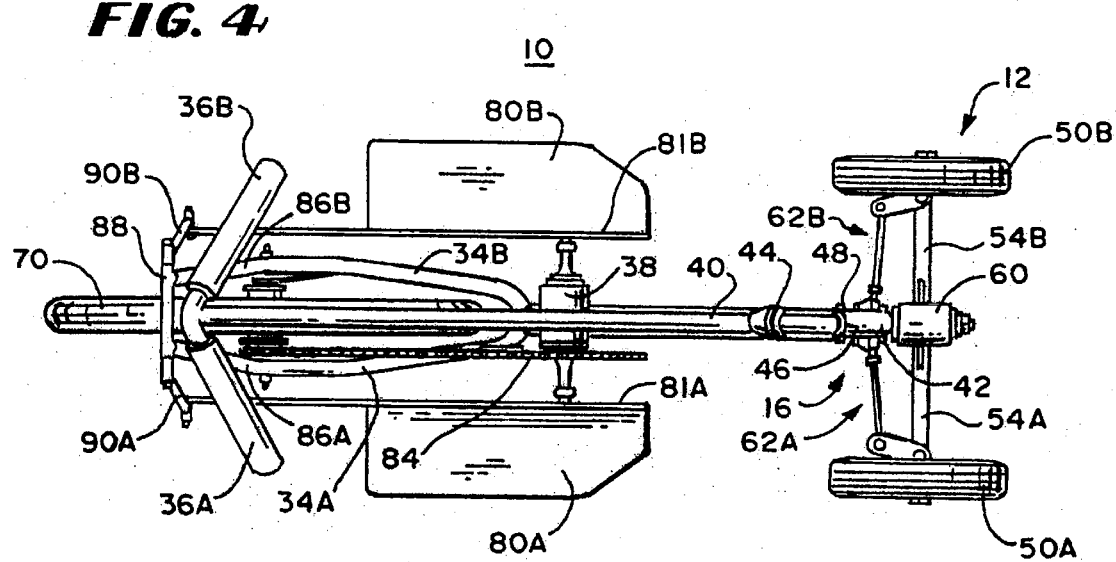
FIG. 4 is a top view of the apparatus of FIG. 1 in a storage position.

In FIG. 4, there is shown a plan view of the exercise vehicle 10 with the collar 44 lifted to disengage the lower vertical portion 42 of the generally vertical upright section 30 (FIG. 1) and permit the upper vertical portion 40 of the vertical upright section 30 (FIG. 1) to be pivoted downwardly and backwardly so that it is substantially horizontal and thus reduce the size of the vehicle. With this arrangement, the vehicle may be more conveniently stored.

As best shown in this view, support struts 81A and 81B extend from a flat foot rest portion of the pedals 80A and 80B backwardly to corresponding ones of the right and left rear pivot arms 90A and 90B to which they are pivotably mounted at the ends of the corresponding pivot arm 90A or 90B and corresponding support strut 81A or 81B. With this arrangement, the right and left rear pivot arms 90A and 90B control the attitude of the pedals during use.

In the operation of the exercise vehicle 10, an operator 11, straddles the vehicle and then places his or her feet on the pedals 80A and 80B. The vehicle 10 stands upright, biased in this position by the elastomeric resilient block 120 (FIG. 2) within the housing 60 of the pivot connection 14. The pedals 80A and 80B are relatively flat so that the operator may support his or her full weight and easily balance the vehicle even while it is stationary.

By pushing on the higher pedal, the operator propels the vehicle forward by turning the sprocket wheels 72 and 82 connected by the chain link. At the higher positions of a pedal, the pedal is slightly at an angle so that the operator is both pressing and pushing on the pedal with his or her toe. Any shifting of the weight of the operator results in a tendency for the main frame to pivot about the pivot point 14 in the direction of the weight shift. This tends to move the bracket 148 (FIG. 2) in the opposite direction and thus similarly moves the turnbuckles 140A and 140B (FIG. 2) and pivots the levers 142A and 142B (FIG. 2) to turn the wheels so that the front of the wheels move in the direction the weight is applied. The shift in weight tends to turn the exercise vehicle.

If the operator is attempting to follow a straight path, he or she must shift the weight of his or her upper body to compensate for the tendency to turn and thus exercises the upper torso. Moreover, when the operator attempts to turn, he or she must lean in the direction of the turn and this further exercises the upper torso. The pedals are relatively horizontal so that they vary in an angle about the horizontal between no more than 15 degrees above the horizontal and 15 degrees below the horizontal plane in the power portion of their cycle. The angle is selected and controlled to make pedaling more effective.

From the above description, it can be understood that the exercise apparatus and technique of this invention has several advantages, such as for example: (1) it provides full body exercise while the operator is moving outdoors such as along a path; (2) it is compact and easily moved from location to location; and (3) it permits ease of movement during use so that the operator can travel along jogging paths or the like which are pleasant for exercising.

Although a preferred embodiment of the invention has been described with some particularity, many modifications and variations in the invention are possible within the light of the above teachings. Therefore, it is to be understood that, within the scope of the appended claims, the invention may be practiced other than as specifically described.

What is claimed is:

1. Apparatus comprising:
    frame means having a tendency to pivot about a horizontal line as the apparatus is used by an operator; wheel means attached to said frame means for movement along a surface;
    drive means;
    steering means;
    pedal means connected to the frame means for rotating said drive means as the pedal means is moved by the operator;
    a horizontal pivot pin;
    said steering means being connected to the frame means by said horizontal pivot pin for motion with respect to said frame means; wherein the steering means is moved in response to the pivoting of the frame means about said horizontal line, whereby the operator using the apparatus must move more than one portion of the operator's body to both move said pedal means and to control said pivoting;
    said pedal means including pedals; and
    the frame means including a frame and handlebars, said frame and handlebars being rigidly connected to each other for movement together during pivoting and turning of said apparatus;
    each of said pedals being sufficiently large to support a different foot of the operator and said handlebars being spaced from said pedals a distance sufficient to permit the operator to pedal while standing on the pedals and holding the handle bars.

2. Apparatus in accordance with claim 1 in which the pedal means includes the drive means and the exercise vehicle is adapted to be pedaled from place to place by said pedal means said drive means including at least one wheel.

3. Apparatus in accordance with claim 1 including releasable fastening means wherein a portion of the apparatus may be collapsed when the apparatus is not in use.

4. Apparatus in accordance with claim 1 in which said handlebars are connected to said frame for movement therewith by releasable fastening means wherein said handlebars may be folded for storage of the apparatus upon release of said fastening means.

5. Apparatus according to claim 4 further including means for biasing said handlebars upright.

6. Apparatus in accordance with claim 1 in which said pedal means includes first and second pivot arms mounted to one end of said pedal means, the other end of said pedal means being mounted to said drive means, whereby said pivot arms control the angle of the pedal as the operator moves the pedals through a cycle to permit a strong driving force during a power stroke by the operator.

7. Apparatus in accordance with claim 6 in which said pedals have an angle of less than 15 degrees from the horizontal when in the position of between 45 degrees above the horizontal to 45 degrees below the horizontal and forward of the center of a drive sprocket wheel.

8. Apparatus comprising:
    frame means having a tendency to pivot about a horizontal line as the apparatus is used by an operator;
    drive means connected to the frame means;
    steering means connected to the frame means;
    pedal means connected to the frame means for rotating said drive means as the pedal means is moved by the operator;
    the steering means including a horizontal pivot means and first and second wheels, and
    said frame means including a frame and handlebars rigidly connected to each other, the pivot means being connected to the frame and steering means and including means for turning the first and second wheels in response to pivoting of the frame about the horizontal line.

9. Apparatus in accordance with claim 8 wherein the exerciser stands on pedals that support substantially an entire foot area.

10. Apparatus in accordance with claim 9 in which the drive means includes means for maintaining the pedals substantially horizontal during a down stroke.

11. Apparatus in accordance with claim 8 in which the pivot means includes:

first and second axle means;

each of said first and second axle means being adapted to rotatably receive corresponding ones of said first and second wheels;

each of said first and second axle means being rotatably connected to said frame means independently of the other of said first and second axle means, whereby each of said first and second wheels may turn in the same direction on said pivot means with respect to said frame means while rotating.

12. Apparatus according to claim 8 in which said pivot means includes control means for causing the wheels to pivot about vertical axes as the frame means pivots about said horizontal line.

13. Apparatus according to claim 12 in which said pivot means further includes means for causing said frame means to pivot about a substantially horizontal pivot pin in the pivot means as the apparatus pivots about said horizontal line of contact under the control of the weight of the operator, wherein said pivoting of the wheel control means occurs as the operator shifts the operator's weight from right to left with respect to said pivot control means.

14. Apparatus in accordance with claim 13 in which:

said handlebars are rigidly connected to said frame means to move as a unit; and said means for turning the wheels turns the wheels with respect to the handlebars.

15. Apparatus according to claim 8 further including a rigid axis between said wheels wherein said pivot means includes a horizontal pivot axis and means connecting said pivot means and a rigid axle for permitting pivoting of said frame with respect to said first and second wheels.

16. Apparatus comprising:

frame means having a tendency to pivot about a horizontal line as the apparatus is used by an operator;

drive means;

steering means;

pedal means connected to the frame means for rotating said drive means as the pedal means is moved by the operator;

said drive means including a rotatable sprocket wheel and a pivot pin rotatably connecting the sprocket wheel to the frame means;

a corresponding first and second pedal arm means for driving said drive means as said pedals are orbited about the pivot pin of the sprocket wheel to rotate the sprocket wheel, and first and second pivot arm means each having means for pivotably mounted to said frame means whereby they may pivot thereon;

each of said pedals being sufficiently large to support a different foot of the operator and said handlebars being spaced from said pedals a distance sufficient to permit the operator to pedal while standing on the pedals and holding the handlebars;

each of said first and second pedals including rigid means pivotably connected at one end to a corresponding one of the first and second pedal arm means and at the other end to a corresponding pivot arm means to cause said pedals to be substantially parallel to a plane of travel of the apparatus when the corresponding first and second pedal arms are parallel to the plane of travel.

17. Apparatus in accordance with claim 16 in which the drive means includes means for maintaining the pedals substantially horizontal during a down stroke.

18. Apparatus in accordance with claim 16 including releasable fastening means wherein a portion of the apparatus may be collapsed when the apparatus is not in use.

19. Apparatus in accordance with claim 18 in which said handlebars are connected to said frame means for movement therewith by releasable fastening means wherein said handlebars may be folded for storage of the apparatus upon release of said fastening means.

20. Apparatus in accordance with claim 18 further including means for biasing said handlebars upright.

21. Apparatus in accordance with claim 16 wherein said pivot arm means control the angle of the pedal as the operator moves the pedals through a cycle to permit a strong driving force during a power stroke by the operator and said pedals have an angle of less than 15 degrees from the horizontal when in the position of between 45 degrees above the horizontal to 45 degrees below the horizontal and forward of the center of the sprocket wheel.

* * * * *